United States Patent
Ikenaka et al.

(10) Patent No.: US 6,728,172 B2
(45) Date of Patent: Apr. 27, 2004

(54) OBJECTIVE LENS AND OPTICAL PICKUP APPARATUS

(75) Inventors: Kiyono Ikenaka, Hachioji (JP); Koji Honda, Hachioji (JP)

(73) Assignee: Konica Corporation, Tokyo (JP)

( * ) Notice: Subject to any disclaimer, the term of this patent is extended or adjusted under 35 U.S.C. 154(b) by 230 days.

(21) Appl. No.: 09/986,612

(22) Filed: Nov. 9, 2001

(65) Prior Publication Data

US 2002/0089764 A1 Jul. 11, 2002

(30) Foreign Application Priority Data

Nov. 14, 2000 (JP) ........................................ 2000-347132

(51) Int. Cl.$^7$ ................................................ G11B 7/00
(52) U.S. Cl. ................................ 369/44.23; 369/112.26; 369/112.23
(58) Field of Search .......................... 369/44.11, 44.12, 369/44.23, 44.26, 44.37, 112.01, 112.03, 112.05, 112.08, 112.1, 112.13, 112.2, 112.23, 112.26

(56) References Cited

U.S. PATENT DOCUMENTS 6,049,519 A  *  4/2000  Arai et al. ............. 369/112.24
6,344,935 B1 *  2/2002  Maruyama ............. 369/112.26

FOREIGN PATENT DOCUMENTS

| EP | 0 996 120 A1 | 4/2000 |
| EP | 1 001 414 A2 | 5/2000 |
| EP | 1 158 503 A2 | 11/2001 |
| WO | WO 00/54262 | 9/2000 |

* cited by examiner

Primary Examiner—Muhammad Edun
(74) Attorney, Agent, or Firm—Finnegan, Henderson, Farabow, Garrett & Dunner, L.L.P.

(57) ABSTRACT

In an objective lens for use in an optical pickup device, when NA1 and N2 (NA2<NA1) represent a needed numerical aperture of the objective lens on an image side, a first spot and a second spot represent a spot formed by the light flux having passed through the central region, a $m^{th}$ order diffracted ray and a $n^{th}$ diffracted ray represent a diffracted ray having the maximum diffraction efficiency among diffracted rays, the central region nearly corresponds to a region through which the light flux in the inside of the numerical aperture NA2 passes, the light amount of the $n^{th}$ order diffracted ray which reaches the inside of the second spot is less than that of the $m^{th}$ order diffracted ray which reaches the inside of the first spot, and the $m^{th}$ order diffracted ray and the $n^{th}$ order diffracted ray satisfy the relationship of m=n.

62 Claims, 5 Drawing Sheets

OBJECTIVE LENS AND OPTICAL PICKUP APPARATUS

BACKGROUND OF THE INVENTION

The present invention relates to an objective lens for an optical pickup device and an optical pickup device, and for example, to an objective lens for an optical pickup device and an optical pickup device which can record on and/or reproduce from optical information recording media each having different density for information recording.

With a recent practical use of a short wavelength red semiconductor laser, there has been developed a high density optical disc DVD (digital versatile disc) that is the same in size as a CD (compact disc) which is a conventional optical disc representing an optical information recording medium, and is designed to have larger capacity. In order to attain high density of a recording signal, in an optical system of an optical information recording/reproducing apparatus employing such an optical disc, a spot formed on a recording medium by an objective lens through light convergence is requested to smaller.

Since there are available various optical discs each having different recording density on the market, it is a heavy burden for a user to purchase an exclusive information recording/reproducing apparatus which can record and/or reproduce information for each optical disc. Due to this, there has been developed an information recording/reproducing apparatus having an optical pickup device which can record or reproduce information for CD with the use of the optical system for recording or reproducing for DVD, for example.

In the optical pickup device stated above, a parallel light enters the objective lens to converge light and form a spot on a recording surface of DVD, while a divergent light enters to converge light and form an appropriate spot on a recording surface of CD, because a parallel light generates an aberration due to the difference of the thickness of a transparent base board for CD, and that for DVD.

Incidentally, since necessary numeral apertures are different each other for DVD and CD, a dichroic filter is used to adjust the required numeral apertures. The dichroic filter has a function that makes a light flux having a wavelength for recording or reproducing of information for DVD to pass through without intercepting the light flux, while makes a light flux having a wavelength for recording or reproducing of information for CD to be shaded so as to have a required numeral aperture for CD. From the view point of cost, it is preferable that information is recorded on or reproduced from optical information recording media each having different density for information recording, without providing the dichroic filter.

SUMMARY OF THE INVENTION

An object of the invention is to provide an objective lens for an optical pickup device and an optical pickup device which can record and/or reproduce (hereinafter referred to also as recording and reproducing) information for optical information recording media each having different density for information recording.

The objective lens for the optical pickup device stated in (1) is the one having therein a first light source which emits a light flux having wavelength $\lambda 1$, a second light source which emits a light flux having wavelength $\lambda 2$ ($\lambda 1$ is not equal to $\lambda 2$), a light-converging optical system including at least the objective lens which converges the light flux emitted from the first light source on the information recording surface via the transparent base board of the first optical information recording medium, in case of recording or reproducing information for the first optical information recording medium, and converges the light flux emitted from the second light source on the information recording surface via the transparent base board of the second optical information recording medium, in case of recording or reproducing information for the second optical information recording medium having density for information recording different from that of the first optical information recording medium, and a photo detector which receives a reflected light or a transmitted light from the first and second optical information recording media, wherein at least one of optical surfaces of the objective lens is provided with a central region without a diffractive structure and a peripheral region with diffractive structure adjacent to the central region, and when NA1 represents a prescribed numerical aperture on the image side of the objective lens which is necessary for recording or reproducing information for the first optical information recording medium using the first light source, a first spot represents a spot formed by the light flux having passed through the central region, and an $m^{th}$ order (m represents nonzero integers) represents a diffracted ray having the maximum diffracted ray amount among diffracted rays ($0^{th}$ order diffracted ray is included, if any) generated by the diffractive structure from the light flux having passed through the peripheral region, and when NA2 (NA2<NA1) represents a prescribed numerical aperture on the image side of the objective lens which is necessary for recording or reproducing information for the second optical information recording medium using the second light source, a second spot represents a spot formed by the light flux having passed through the central region, and an $n^{th}$ diffracted ray (n is nonzero integers) represents a diffracted ray having the maximum diffracted ray amount among diffracted rays ($0^{th}$ order diffracted ray is included, if any) generated by the diffractive structure from the light flux having passed through the spherical area, the above-mentioned central region nearly corresponds to a region through which the light flux in the numerical aperture NA2 passes, an amount of the $n^{th}$ order diffracted ray which reaches the inside of the second spot is less than that of the $m^{th}$ order diffracted ray which reaches the inside of the first spot, and the $m^{th}$ order diffracted ray and the $n^{th}$ order diffracted ray satisfy the relationship of m=n.

That is, when the light flux having passed through the peripheral region having the diffractive structure reaches the inside of the spot formed by the light flux having passed through the central region, the spot diameter of the light flux passed through the spherical area becomes smaller, because its numeral aperture NA is larger. In the objective lens stated in (1), the amount of the light flux of the $n^{th}$ order diffracted ray reaching the inside of the second spot is smaller than that of the light flux of the $m^{th}$ order diffracted ray reaching the inside of the first spot. Due to this, when the light flux having wavelength $\lambda 1$ enters the objective lens, the spot diameter becomes so small that it is possible to record or reproduce for the optical information recording medium having high recording density, and on the other hand, when the light flux having wavelength $\lambda 2$ ($\lambda 2 > \lambda 1$) enters the objective lens, the spot diameter becomes so large that it is possible to record or reproduce for the optical information recording medium having low recording density. In particular, it is preferable that the light amount of the light flux of the nth order diffracted ray reaching the inside of the second spot is small to the extent which does not affect substantially (to the level that the spot diameter does not become too small) the spot diameter of the second spot which is necessary for recording or reproducing for the second optical information recording medium. And further, it is preferable that the amount of the light reaching the inside of the second spot is small to the extent which does not change the spot diameter substantially for all light fluxes outside the numerical aperture NA1, including the light flux of the $n^{th}$ order diffracted ray.

In the diffractive structure satisfying the relationship of order m=n, the sectional form including an optical axis is nearly like a saw-tooth, and since it is possible to make the step amount in the direction of the optical axis to be relatively small, there is a merit that the die making is performed relatively easily by a lathe. Still further, by using such a diffractive structure, the recording or reproduction of information can be performed properly for each of the optical information recording media having the different recording density, without using a dichroic filter.

Incidentally, the expression of "nearly correspond" in this specification means that each of the areas needs not agree with the other perfectly, and that there can be exist a slight difference each other within the limit which does not depart from the effect of the invention (i.e. a limit in which there is not substantial effect on the spot diameter for recording on or reproducing from the above-mentioned second optical information recording medium). It is a matter of course that the integers m and n include the numbers having the positive and negative signs. Further, since there is no diffractive structure in the central region, an efficiency of utilization of the incident ray can be raised by using the simple structure, comparing with the case having the diffractive structure. The order of the diffracted ray which is positive in this specification means that the effect of the diffraction has the power of the convergence that turns the light flux to direction of the optical axis.

The objective lens for the optical pickup device stated in (2) can control the reduction of the transmittance of the objective lens to the utmost, because the diffractive structure has the sectional form including an optical axis that is nearly like a saw-tooth. Further, comparing with the case having the sectional style of irregular rectangle, the die for molding the lens can be produced easily as stated above.

The objective lens for the optical pickup device stated in (3) can control the reduction of the transmittance of the objective lens to the utmost, because the saw-tooth diffractive structure has the step section that is nearly in parallel with the optical axis.

The objective lens for the optical pickup device stated in (4) can raise extremely the utilization efficiency of the light flux having wavelength of λ1, because the diffractive structure is blazed at the wavelength λ1. That is, with regard to the light flux having wavelength of λ1, by blazing at the wavelength λ1, the efficiency of the special ordered diffracted ray, can be raised higher than that of another ordered diffracted ray, among diffracted rays generated by the diffractive structure in the peripheral region.

The objective lens for the optical pickup device stated in (5) is characterized in that the amount of the $n^{th}$ order diffracted ray is not less than 90% of the total amount of the diffracted ray generated by the diffractive structure, when the light flux comes from the second light source to enter the objective lens.

If there are a plurality of order numbers of the diffracted ray that are generated from the light fluxes emitted from the second light source by the diffractive structure, it is difficult, in all of the ordered numbers of the diffractive light, to prevent that light fluxes which reach the inside of the second spot to make the spot diameter smaller, and light fluxes which generate the noise resulting in malfunction of the focus error signal are generated. Therefore, by determining the light amount of the $n^{th}$ order light to be 90% or more of the total light amount of the diffracted ray generated by the diffractive structure, the amount of diffracted ray except for the $n^{th}$ order diffracted ray become small, as a result, it is possible to reduce the generation of the light flux which exert a bad influence on the spot or the focus error signal to an acceptable lower level, that is not problematic.

The objective lens for the optical pickup device stated in (6) can increase the light utilization efficiency, because its central region is an aspherical refracting interface.

The objective lens for the optical pickup device stated in (7) can be produced with ease, because at least one optical surface is composed of the central region and the peripheral region, which is a simple construction of the optical surface having two areas.

The objective lens for the optical pickup device stated in (8) is characterized in that the light flux emitted from the second light source enters the objective lens with an angle of divergence which is larger than that of the light flux emitted from the first light source.

For example, when the recording or reproduction of information is performed for the optical information recording media such as DVD and CD which are different each other in terms of the thickness of the transparent base board, if the recording or reproduction of information is performed on the second optical information recording medium (CD) having the thicker transparent base board, using the light flux which is corrected in terms of the spherical aberration on the first optical information recording medium (DVD) having the thinner transparent base board, the spherical aberration is overcorrected. For this problem, by making the angle divergence of the light flux entering the objective lens larger, the correction of the spherical aberration can be returned to the under correction side. That is, for recording on or reproducing from CD about information, the spherical aberration can be corrected appropriately, by making the angle of divergence of the incident light flux to be larger than that in the case of recording or reproducing of information for DVD. Incidentally, in this specification, an angle of divergence means the angle which is formed with the optical axis and the light which enters the position of the same height from the optical axis, on the surface of the objective lens closer to the light source.

The objective lens for the optical pickup device stated in (9) is characterized in that the light flux which is emitted from the first light source and enters the objective lens is nearly in parallel with the optical axis.

The objective lens for the optical pickup device stated in (10) is characterized in that the light flux emitted from the second light source enters the objective lens so that a lateral magnification m2 may satisfy $-\frac{1}{20} < m2 < -\frac{1}{10}$.

The objective lens for the optical pickup device stated in (11) is characterized in that the light flux of the $n^{th}$ order diffracted ray crosses the optical axis at the position closer to the objective lens than that for the light flux having passed through the central region to form the second spot.

The variation of the spherical aberration component of wave-front aberration which is caused by the temperature variation of the refractive index can be made smaller, because the converging power caused by the refraction of the objective lens can be made smaller, when the converging power is given by the diffraction effect. Further, the variation of the spherical aberration component of wave-front aberration caused by the wavelength variation can reduce the variation of the spherical aberration component of wavefront aberration caused by the temperature variation, because it has reverse sign to the variation of the refractive index caused by the temperature variation, when the diffraction has the converging power. By making the $n^{th}$ order diffracted ray to cross the optical axis at the position closer to the objective lens than that for the light flux having passed through the central region to form the second spot, the converging power of the diffraction grows greater, and the temperature variation of the spherical aberration component of the wave-front aberration is made to be smaller. Incidentally, when the divergent light enters the objective lens, it is desirable that the $n^{th}$ order diffracted ray crosses the optical axis at the position closer to the objective lens, because it is difficult to make the converging power of the diffraction to be larger, when the $n^{th}$ order diffracted ray crosses the optical axis at the position away from the objective lens, comparing with the light flux having passed through the central region to form the second spot.

The objective lens for the optical pickup device stated in (12) is characterized in that the diffractive structure of the peripheral region where the light flux in the prescribed numerical aperture NA1 has a ring-shaped diffractive zone, and the number of the ring-shaped diffractive zones is equal to or greater than 5 and equal to or less than 20.

In the case that the diameter of the objective lens has been determined, if the number of the ring-shaped zones is great, the width of the ring-shaped zone becomes narrower, the influence of the deformation of the ring-shaped diffractive zone caused by the die making or the molding becomes larger, and the diffraction efficiency for the order giving the maximum amount of the diffracted ray becomes lower. Due to this, regarding the light flux having wavelength of $\lambda 1$, the transmission efficiency of the $m^{th}$ order diffracted ray having passed through the peripheral region becomes lower than the transmission efficiency of the light flux having passed through the central region, and the spot diameter becomes larger because of an apodization effect. Further, if the number of the ring-shaped zones is small, the effect of the diffraction becomes low. Accordingly, it is desirable that the number of the ring-shaped diffractive zone of the diffractive structure of the peripheral region where the light flux within the prescribed numerical aperture NA1 passes is not less than 5 and not more than 20.

The objective lens for the optical pickup device stated in (13) is characterized in that the light flux of the $n^{th}$ order diffracted ray crosses the optical axis at the position that is away from the position by 5 $\mu$m or more where the light flux having passed through the central region of the objective lens crosses the optical axis.

The objective lens for the optical pickup device stated in (14) is characterized in that, among the light fluxes emitted from the second light source and refracted by the basic aspheric surface of the diffractive structure of the peripheral region, the light flux passing through the boundary area between the central region and the peripheral region crosses the optical axis at the position that is away from the position by 5 $\mu$m or more where the light flux emitted from the second light source and passed through the central region of the objective lens crosses the optical axis.

If the positions where the light flux having passed through the periphery area and the light flux having passed through the central region both emitted from the second light source cross respectively the optical axis are close to each other, there occurs bad influence that the spot diameter of the second spot formed by the light flux passed through the central region becomes larger. Therefore, regarding the light fluxes emitted from the second light source, it is desirable that the position where the light flux having passed through the peripheral region crosses the optical axis is away by 5 $\mu$m or more from the position where the light flux having passed through the central region crosses the optical axis.

The objective lens for the optical pickup device stated in (15) is characterized in that, the relationship of n=m=+1 is satisfied in the $n^{th}$ order diffracted ray and the $m^{th}$ order diffracted ray.

The objective lens for the optical pickup device stated in (16) is characterized in that, the numerical aperture NA2 satisfies the relationship of 0.45<NA2<0.6.

The objective lens for the optical pickup device stated in (17) is characterized in that, the numerical aperture NA2 satisfies the relationship of 0.45<NA2<0.5.

The objective lens for the optical pickup device stated in (18) is characterized in that, the wavelength $\lambda 1$ satisfies the relationship 640 nm<$\lambda 1$<680 nm, and the wavelength $\lambda 2$ satisfies the relationship 750 nm<$\lambda 2$<810 nm.

The objective lens for the optical pickup device stated in (19) is characterized in that, the thickness t1 of the transparent base board of the first optical information recording medium and the thickness t2 of the transparent base board of the second optical information recording medium satisfy the relationship of t1<t2.

The objective lens for the optical pickup device stated in (20) is characterized in that, thickness t1 of the transparent base board of the first optical information recording medium is 0.6 mm and thickness t2 of the transparent base board of the second optical information recording medium is 1.2 mm.

The objective lens for the optical pickup device stated in (21) is characterized in that, in the light fluxes emitted from the first light source, the difference between the transmittance of the $m^{th}$ order diffracted ray and the transmittance of the light flux passed through the central region is within 5%.

When the transmittance of the $m^{th}$ order diffracted ray is smaller than the transmittance of the central region, the spot diameter becomes larger by the apodization effects. In order to be equal to the spot diameter of the prescribed numeral aperture, it is desirable that the difference between the transmittance of the $m^{th}$ order diffracted ray and the transmittance of the light flux passed through the central region is within 5%. Incidentally, in this specification, the transmittance means the ratio of an amount of light of the light flux entering the objective lens to an amount of the light flux entering the objective lens.

The optical pickup device stated in (22) is the one having therein a first light source which emits a light flux having wavelength $\lambda 1$, a second light source which emits a light flux having wavelength $\lambda 2$ ($\lambda 1$ is not equal to $\lambda 2$), a light-converging optical system including at least the objective lens which converges the light flux emitted from the first light source on the information recording surface via the transparent base board of the first optical information recording medium, in case of recording or reproducing information for the first optical information recording medium, and converges the light flux emitted from the second light source on the information recording surface via the transparent base board of the second optical information recording medium, in case of recording or reproducing information for the second optical information recording medium having density for information recording different from that of the first optical information recording medium, and a photo detector which receives a reflected light or a transmitted light from the first and second optical information recording media, wherein at least one of optical surfaces of the objective lens is provided with a central region without a diffractive structure and a peripheral region with diffractive structure adjacent to the central region, and when NA1 represents a prescribed numerical aperture on the image side of the objective lens which is necessary for recording or reproducing information for the first optical information recording medium using the first light source, a first spot represents a spot formed by the light flux having passed through the central region, and an $m^{th}$ order diffracted ray (m represents nonzero integers) represents a diffracted ray having the maximum diffracted ray amount among diffracted rays ($0^{th}$ order diffracted ray is included, if any) generated by the diffractive structure from the light flux having passed through the peripheral region, and when NA2 (NA2<NA1) represents a prescribed numerical aperture on the image-side of the objective lens which is necessary for recording or reproducing information for the second optical information recording medium using the second light source, a second spot represents a spot formed by the light flux having passed through the central region, and an $n^{th}$ diffracted ray (n is nonzero integers) represents a diffracted ray having the maximum diffracted ray amount among diffracted rays ($0^{th}$ order diffracted ray is included, if any) generated by the diffractive structure from the light flux having passed through the spherical area, the above-mentioned central region nearly corresponds to a region through which the light flux in the numerical aperture NA2 passes, an amount of the $n^{th}$ order diffracted ray which reaches the inside of the second spot is less than that of the $m^{th}$ order diffracted ray which reaches the inside of the first spot, and the $m^{th}$ order diffracted ray and the $n^{th}$ order diffracted ray satisfy the relationship of m=n.

That is, when the light flux having passed through the peripheral region having the diffractive structure reaches the inside of the spot formed by the light flux having passed through the central region, the spot diameter of the light flux passed through the spherical area becomes smaller, because its numeral aperture NA is larger. In the optical pickup device stated in (22), the amount of the light flux of the $n^{th}$ order diffracted ray reaching the inside of the second spot is smaller than that of the light flux of the $m^{th}$ order diffracted ray reaching the inside of the first spot. Due to this, when the light flux having wavelength $\lambda 1$ enters the objective lens, the spot diameter becomes so small that it is possible to record or reproduce for the optical information recording medium having high recording density, and on the other hand, when the light flux having wavelength $\lambda 2$ ($\lambda 2 > \lambda 1$) enters the objective lens, the spot diameter becomes so large that it is possible to record or reproduce for the optical information recording medium having low recording density.

In the diffractive structure satisfying the relationship of order m=n, the sectional form including an optical axis is nearly like a saw-tooth, and since it is possible to make the step amount in the direction of the optical axis to be relatively small, there is a merit that the die making is performed relatively easily by a lathe. Still further, by using such a diffractive structure, the recording or reproduction of information can be performed properly for each of the optical information recording media having the different recording density, without using a dichroic filter.

The optical pickup device stated in (23) is characterized in that the diffractive structure of the objective lens has the sectional form including an optical axis that is nearly like a saw-tooth.

The optical pickup device stated in (24) is characterized in that the saw-tooth diffractive structure of the objective lens has the step section that is nearly in parallel with the optical axis.

The optical pickup device stated in (25) is characterized in that the diffractive structure of the objective lens is blazed at the wavelength $\lambda 1$.

The optical pickup device stated in (26) is characterized in that the amount of the $n^{th}$ order diffracted ray is not less than 90% of the total amount of the diffracted ray generated by the diffractive structure, when the light flux comes from the second light source to enter the objective lens.

The optical pickup device stated in (27) is characterized in that the central region of the objective lens is an aspherical refracting surface.

The optical pickup device stated in (28) is characterized in that at least one optical surface of the objective lens is composed of the central region and the peripheral region.

The optical pickup device stated in (29) is characterized in that the light flux emitted from the second light source enters the objective lens with an angle of divergence which is larger than that of the light flux emitted from the first light source.

The optical pickup device stated in (30) is characterized in that the light flux which is emitted from the first light source and enters the objective lens is nearly in parallel with the optical axis.

The optical pickup device stated in (31) is characterized in that the light flux emitted from the second light source enters the objective lens so that a lateral magnification m2 may satisfy $-1/20 < m2 < -1/10$.

The optical pickup device stated in (32) is characterized in that the light flux of the $n^{th}$ order diffracted ray crosses the optical axis at the position closer to the objective lens than that for the light flux having passed through the central region to form the second spot.

The optical pickup device stated in (33) is characterized in that, in the objective lens, the diffractive structure of the peripheral region where the light flux in the prescribed numerical aperture NA1 passes through has a ring-shaped diffractive zone, and the number of the ring-shaped diffractive zones is equal to or greater than 5 and equal to or less than 20.

The optical pickup device stated in (34) is characterized in that the light flux of the $n^{th}$ order diffracted ray crosses the optical axis at the position that is away from the light flux having passed through the central region of the objective lens by 5 $\mu$m or more.

The optical pickup device stated in (35) is characterized in that, among the light fluxes emitted from the second light source and refracted by the basic aspheric surface of the diffractive structure of the peripheral region, the light flux passing through the boundary area between the central region and the peripheral region crosses the optical axis at the position that is away from the light flux emitted from the second light source and passed through the central region of the objective lens by 5 $\mu$m or more.

The optical pickup device stated in (36) is characterized in that, the relationship of n=m=+1 is satisfied in the $n^{th}$ order diffracted ray and the $m^{th}$ order diffracted ray.

The optical pickup device stated in (37) is characterized in that, the numerical aperture NA2 satisfies the relationship of 0.45<NA2<0.6.

The optical pickup device stated in (38) is characterized in that, the numerical aperture NA2 satisfies the relationship of 0.45<NA2<0.5.

The optical pickup device stated in (39) is characterized in that, the wavelength $\lambda 1$ satisfies the relationship 640 nm<$\lambda 1$<680 nm, and the wavelength $\lambda 2$ satisfies the relationship 750 nm<$\lambda 2$<810 nm.

The optical pickup device stated in (40) is characterized in that, the thickness t1 of the transparent base board of the first optical information recording medium and the thickness t2 of the transparent base board of the second optical information recording medium satisfy the relationship of t1<t2.

The optical pickup device stated in (41) is characterized in that, thickness t1 of the transparent base board of the first optical information recording medium is 0.6 mm and thickness t2 of the transparent base board of the second optical information recording medium is 1.2 mm.

The optical pickup device stated in (42) is characterized in that, in the light fluxes emitted from the first light source, the difference between the transmittance of the $m^{th}$ order diffracted ray and the transmittance of the light flux passed through the central region is within 5%.

It is preferable that the objective lens stated in (43) is applied to the optical pickup device stated in either one of (22)–(41).

The objective lens for the optical pickup device stated in (44) is characterized in that, at least one of optical surfaces of the objective lens is provided with a central region without a diffractive structure and a peripheral region with diffractive structure adjacent to the central region, and when NA1 represents a prescribed numerical aperture on the image side of the objective lens which is necessary for recording or reproducing information for the first optical information recording medium using the first light source, a first spot represents a spot formed by the light flux having passed through the central region, and an $m^{th}$ order diffracted ray (m represents nonzero integers) represents a diffracted ray having the maximum diffracted ray amount among diffracted rays ($0^{th}$ order diffracted ray is included, if any) generated by the diffractive structure from the light flux having passed through the peripheral region, and when NA2 (NA2<NA1) represents a prescribed numerical aperture on the image side of the objective lens which is necessary for recording or reproducing information for the second optical information recording medium using the second light source, a second spot represents a spot formed by the light flux having passed through the central region, and an $n^{th}$ diffracted ray (n is nonzero integers) represents a diffracted ray having the maximum diffracted ray amount among diffracted rays ($0^{th}$ order diffracted ray is included, if any) generated by the diffractive structure from the light flux having passed through the spherical area, the above-mentioned central region nearly corresponds to a region through which the light flux in the numerical aperture NA2 passes, an amount of the $n^{th}$ order diffracted ray which reaches the inside of the second spot is less than that of the $m^{th}$ order diffracted ray which reaches the inside of the first spot, and the $m^{th}$ order diffracted ray and the $n^{th}$ order diffracted ray satisfy the relationship of m=n.

That is, when the light flux having passed through the peripheral region having the diffractive structure reaches the inside of the spot formed by the light flux having passed through the central region, the spot diameter of the light flux passed through the spherical area becomes smaller, because its numeral aperture NA is larger. In the objective lens stated in (44), the amount of the light flux of the $n^{th}$ order diffracted ray reaching the inside of the second spot is smaller than that of the light flux of the $m^{th}$ order diffracted ray reaching the inside of the first spot. Due to this, when the light flux having wavelength $\lambda 1$ enters the objective lens, the spot diameter becomes so small that it is possible to record or reproduce for the optical information recording medium having high recording density, and on the other hand, when the light flux having wavelength $\lambda 2$ ($\lambda 2$>$\lambda 1$) enters the objective lens, the spot diameter becomes so large that it is possible to record or reproduce for the optical information recording medium having low recording density. In particular, it is preferable that the light amount of the light flux of the $n^{th}$ order diffracted ray reaching the inside of the second spot is small to the extent which does not affect substantially (to the level that the spot diameter does not become too small) the spot diameter of the second spot which is necessary for recording or reproducing for the second optical information recording medium.

In the diffractive structure satisfying the relationship of order m=n, the sectional form including an optical axis is nearly like a saw-tooth, and since it is possible to make the step amount in the direction of the optical axis to be relatively small, there is a merit that the die making is performed relatively easily by a lathe. Further, since there is no diffractive structure in the central region, an efficiency of utilization of the incident ray can be raised by using the simple structure, comparing with the case having the diffractive structure.

The objective lens for the optical pickup device stated in (45) is characterized in that the diffractive structure has the sectional form including an optical axis that is nearly like a saw-tooth. Since the function and effect of the invention mentioned in (45) is the same as those of (2), the explanation is omitted.

The objective lens for the optical pickup device stated in (46) is characterized in that the saw-tooth diffractive structure has the step section that is nearly in parallel with the optical axis. Since the function and effect of the invention mentioned in (46) is the same as those of (3), the explanation is omitted.

The objective lens for the optical pickup device stated in (47) is characterized in that the diffractive structure is blazed at the wavelength $\lambda 1$. Since the function and effect of the invention mentioned in (47) is the same as those of (4), the explanation is omitted.

The objective lens for the optical pickup device stated in (48) is characterized in that the amount of the $n^{th}$ order diffracted ray is not less than 90% of the total amount of the diffracted ray generated by the diffractive structure, when the parallel light flux from the second laser enters the objective lens. Since the function and effect of the invention mentioned in (48) is the same as those of (5), the explanation is omitted.

The objective lens for the optical pickup device stated in (49) is characterized in that its central region is an aspherical refracting interface. Since the function and effect of the invention mentioned in (49) is the same as those of (6), the explanation is omitted.

The objective lens for the optical pickup device stated in (50) is characterized in that, at least one optical surface is composed of the central region and the peripheral region. Since the function and effect of the invention mentioned in (50) is the same as those of (7), the explanation is omitted.

The objective lens for the optical pickup device stated in (51) is characterized in that, the absolute value of the spherical aberration component of the wave-front aberration of the light flux having passed through the central region is smaller than that of the light flux forming the second spot, when the light flux emitted from the second laser is controlled so that a light flux diverged to prescribed extent than the parallel light flux may enter. Since the function and effect of the invention mentioned in (51) is the same as those of (8), the explanation is omitted.

The objective lens for the optical pickup device stated in (52) is characterized in that, the absolute value of the spherical aberration component of the wave-front aberration for the light flux having passed through the central region becomes the smallest, in the case that the light flux from the first laser is nearly the parallel light flux, compared with an occasion where the diverged or converged light flux enters instead of the parallel light flux.

The objective lens for the optical pickup device stated in (53) is characterized in that the second laser enters the objective lens so that a lateral magnification m2 may satisfy $-\frac{1}{20}<m2<-\frac{1}{10}$.

The objective lens for the optical pickup device stated in (54) is characterized in that the light flux of the $n^{th}$ order diffracted ray crosses the optical axis at the position closer to the objective lens than that for the light flux having passed through the central region to form the second spot.

The objective lens for the optical pickup device stated in (55) is characterized in that the diffractive structure of the peripheral region where the light flux in the prescribed numerical aperture NA1 has a ring-shaped diffractive zone, and the number of the ring-shaped diffractive zones is equal to or greater than 5 and equal to or less than 20.

The objective lens for the optical pickup device stated in (56) is characterized in that, the light flux of the $n^{th}$ order diffracted ray crosses the optical axis at the position that is away from the position where the light flux having passed through the central region of the objective lens to form the second spot crosses the optical axis, by 5 μm or more.

The objective lens for the optical pickup device stated in (57) is characterized in that, when the parallel light flux from the second laser enters, the light flux refracted by the basic aspheric surface of the diffractive structure of the peripheral region crosses the optical axis at the position that is away from the position where the light flux having passed through the central region of the objective lens crosses the optical axis, by 5 μm or more.

The objective lens for the optical pickup device stated in (58) is characterized in that, the relationship of n=m=+1 is satisfied in the $n^{th}$ order diffracted ray and the $m^{th}$ order diffracted ray.

The objective lens for the optical pickup device stated in (59) is characterized in that, the wavelength $\lambda 1$ satisfies the relationship 640 nm<$\lambda 1$<680 nm, and the wavelength $\lambda 2$ satisfies the relationship 750 nm<$\lambda 2$<810 nm.

The optical pickup device stated in (60) is characterized in that it has a first light source which emits a first laser, a second light source which emits a second laser, a light-converging optical system including at least the objective lens stated in at least one of the items from (44) to (58), which converges the laser emitted from the first light source on the information recording surface via the transparent base board of the first optical information recording medium, in case of recording or reproducing information for the first optical information recording medium, and converges the second laser emitted from the second light source on the information recording surface via the transparent base board of the second optical information recording medium, in case of recording or reproducing information for the second optical information recording medium having density for information recording different from that of the first optical information recording medium, and a photo detector which receives a reflected light or a transmitted light from the first and second optical information recording media.

The optical pickup device stated in (61) is characterized in that, the wavelength $\lambda 1$ of the first laser satisfies the relationship of 640 nm<$\lambda 1$<680 nm, the wavelength $\lambda 2$ of the second laser satisfies the relationship of 750 nm<$\lambda 2$<810 nm, the first optical information recording medium is the optical disc representing DVD, and the second optical information recording medium is the optical disc representing CD.

The diffractive structure shown in this specification means a form (or a surface) that is given a function to change an angle of the ray of light by diffraction, by a relief provided on the surface of an optical element such as the surface of the lens. The form of the relief is the one that is formed on the surface of the optical element, for example, to be ring-shaped zones which are almost in a shape of concentric circles on centering the optical axis, and each ring-shaped zone looks like as serrated (a saw-tooth), when its section is viewed on the plane including the optical axis.

The objective lens in this specification means, in the narrow sense, a lens that has a converging function and is located at the nearest position to the optical information recording medium to face this, in the optical pickup device having thereon the optical information recording medium, and in the broad sense, a lens group that can be moved at least in the direction of an optical axis together with the above-mentioned lens by the actuator. Here, the lens group means at least one or more lenses. Accordingly, in this specification, the numerical aperture NA of the objective lens on the optical information recording medium side means the numerical aperture NA of the light flux emitted to the optical information recording medium side from the lens surface of the objective lens positioned to be closest to the optical information recording medium. Further in this specification, the prescribed numerical aperture that is necessary when information is recorded or reproduced for the optical information recording medium means the numerical aperture stipulated by the standard of each optical information recording medium, or the numerical aperture of the objective lens having the diffraction limit power that can obtain the spot diameter that is necessary for recording or reproducing information, according to the wavelength of the light source used for each of the optical information recording media.

In this specification, the optical information recording media (optical discs) include a disc type of the current optical information recording media such as the various CDs representing CD-R, CD-RW, CD-Video, and CD-ROM, the various DVDs representing DVD-ROM, DVD-RAM, DVD-R, DVD-RW, DVD+RW, and DVD-Video, or MD, and also include the advanced recording media. There are provided transparent base boards on the information recording surfaces of the various optical information recording media. However, those having the transparent base boards whose thickness is almost zero or those having no transparent base board at all exist or are proposed. Though the expression of "via the transparent base board" may appear in this specification, as a matter of convenience for explanation, it also includes the case where the thickness of the transparent base board is zero, that is, the case where there is no transparent base board.

In this specification, the recording and reproduction of information mean recording information on the information recording surface of the optical information recording medium, and reproducing information recorded on the information recording surface. The optical pickup device of the invention may be one used for recording only or for reproducing only, or it may be one used for both of recording and reproduction. Further, the optical pickup device may be one that is used for recording for a certain information recording medium, while used for reproduction for the other information recording medium, or it may be one used for recording or reproduction for a certain information recording medium, while used for recording and reproduction for the other information recording media. Incidentally, only reading of information is also included in the reproduction in this case.

The optical pickup device of the invention can be provided on the recording and/or reproduction apparatus of sound and/or image representing the various players or drivers, or AV devices, personal computers, and another information terminals in which the various players or drivers are provided.

DETAILED DESCRIPTION OF THE PREFERRED EMBODIMENT

Figure 1:
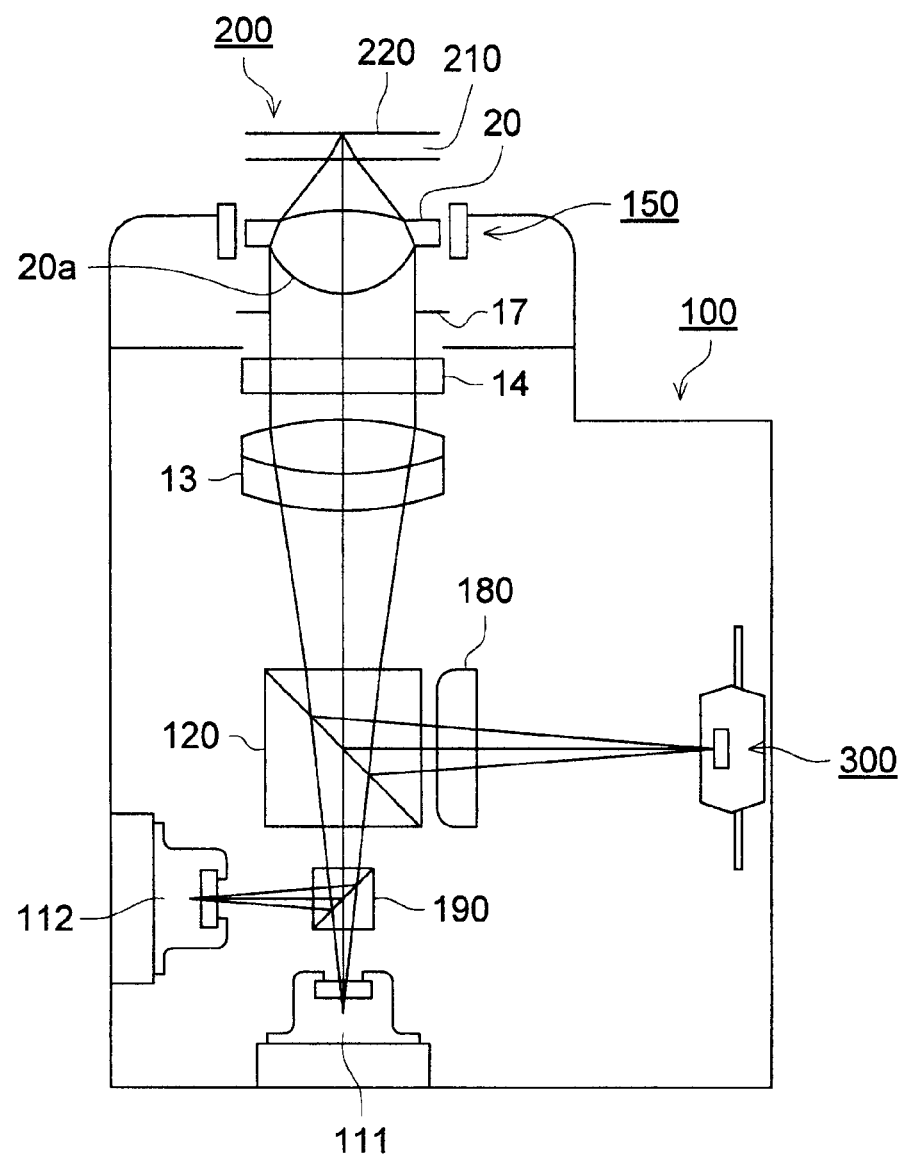
FIG. 1 is a schematic structural drawing showing the optical pickup device of the present embodiment.

Preferable embodiments of the invention will be explained as follows, referring to the following drawings. FIG. 1 is a schematic structural diagram showing an optical pickup device of the present embodiment.

The optical pickup device shown in FIG. 1 is provided with first semiconductor laser 111 representing a first light source for recording and reproduction for a first optical information recording medium (herein, an optical disc for DVD), and second semiconductor laser 112 representing a second light source for recording and reproduction for a second optical information recording medium (herein, an optical disc for CD).

Firstly, when the recording and reproduction of information are performed on the first optical information recording medium, a beam is emitted from the first semiconductor laser 111, and the emitted light flux is transmitted through beam splitter 190, polarization beam splitter 120, collimator 13 and quarter wavelength plate 14, and it becomes circularly polarized parallel light flux. The light flux is stopped down by a diaphragm 17, and is converged on information recording surface 220 by objective lens 20 via transparent base board 210 (t1=0.6 mm) of first information recording medium 200. Incidentally, a first spot means a spot formed on the information recording surface 220 by the light flux passing through the central region of the objective lens 20. Further, when the recording and reproduction of information are performed for the first information recording medium, the actual spot formed on the surface of the information recording surface is formed by the light flux passing through the central region and the +1$^{st}$ order light flux by the diffractive structure of the peripheral region.

Then, the light flux, which was modulated by information bits and reflected on the information recording surface 220 of the first optical information recording medium, passes through the objective lens 20, the diaphragm 17, the quarter wavelength plate 14 and the collimator 13 again, and enters the polarization beam splitter 120 to be reflected thereon, and to be given astigmatism by cylindrical lens 180, and further enters optical detector 300. Thus, the readout signal of information which is recorded on the first optical information recording medium 200 is obtained by using its output signal.

Further, by detecting an amount of light variation generated by the shape variation and position variation of the spot on the photo-detector 300, the focusing detection and track detection are performed. Based on these detections, two dimensional actuator 150 moves the objective lens 20 so as to form an image of the first spot on the recording surface 220 of the first optical information recording medium 200 by the light flux of the first semiconductor laser 111, and also moves the objective lens 20 so as to form an image of the light flux of the semiconductor laser 111 on the prescribed track.

When the recording and reproduction of information are performed for the second optical information recording medium, a beam is emitted from the second semiconductor laser 112, the emitted light flux is reflected by the beam splitter 190 representing light combining means, and in the same way as the above-mentioned light flux from the first semiconductor laser 111, the light flux passes through the polarization beam splitter 120, the collimator 13 and the quarter wavelength plate 14, the diaphragm 17 and the objective lens 20, and the light flux passing through the central region of the objective lens is converged on the information recording surface 220 to form the second spot, via the transparent base board 210 (t2=1.2 mm) of the second information recording medium 200. On the other hand, as mentioned later, the light flux passing through the peripheral region of the objective lens 20 on which the diffractive structure D is formed becomes the flare that has smaller amount of light per unit area as compared with the second spot. Further, compared with the amount of light that is contributed by the arrival of the +1$^{st}$ order diffracted ray by the first semiconductor laser 111 at the first spot as mentioned above, the amount of light that is contributed by the arrival of the +1$^{st}$ order diffracted ray by the second semiconductor laser 112 at the second spot is smaller. In the present example of the objective lens stated later, the light flux of the +1$^{st}$ order diffracted ray of the former reaches nearly 100% in amounts, while that of the +1$^{st}$ order diffracted ray of the latter does not reach substantially. Here, the light flux of the +1$^{st}$ order diffracted ray crosses the optical axis at the position closer to the objective lens and preferably 5 μm or more away from the position where the light flux having passed through the central region to form the second spot crosses the optical axis. Incidentally, the position of the second semiconductor laser 112 is determined so that the light flux having passed through the collimator 13 may become the divergent light. In this case, it is preferable that the light flux enters the objective lens 20 within the limit of lateral magnification m2 that is greater than −1/20 and is smaller than −1/10.

However, among the laser emitted from the semiconductor laser 112, the light flux, which passes through the position closest to the central region in the peripheral region of the objective lens 20, that is, the border of them, crosses the optical axis at the position 5 μm away from the position where the light flux having passed through the central region of the objective lens 20 crosses the optical axis. Incidentally, when the recording and reproduction of information are performed for the second optical information recording medium, the real spot formed on the information recording surface is formed by the flux having substantially passed through the central region.

The light flux, which was modulated by information bit and reflected on the information recording surface 220 of the second optical information recording medium, enters the photo-detector 300, via the objective lens 20, the diaphragm 17, the quarter wavelength plate 14, the collimator 13, the polarization beam splitter 120 and the cylindrical lens 180 again, and by using its output signal, the readout signal of information which is recorded on the second optical information recording medium 200 is obtained.

Further, same as the case of the first optical information recording medium, by detecting an amount of light variation generated by the shape variation and position variation of the spot on the optical detector 300, focusing detection and track detection are performed, and the objective lens 20 is moved by the two dimension actuator 150 for the purpose of focusing and tracking.

Figure 2:
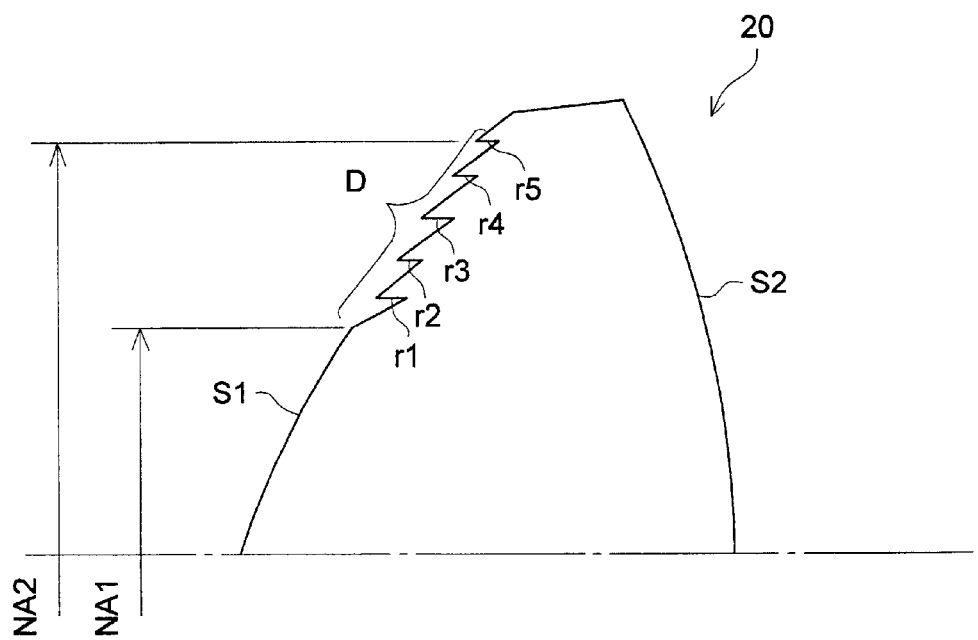
FIG. 2 is a diagram illustratively showing the section including the optical axis of the upper part of the objective lens having diffractive structure.

Incidentally the present objective lens can be fit for the optical pickup devices using the optical system having two kinds of wavelength semiconductor lasers in which the semiconductor laser 111 and the semiconductor laser 112 are unitized, and the light source-detector module in which the semiconductor laser 111, the semiconductor laser 112 and the photo-detector are unitized. It is also possible to use the present optical lens for the pickup optical system having a plurality of light sources which are known to those versed in the art. The diffracted ray having the maximum amount of the light among diffracted rays generated by the diffractive structure of the peripheral region is determined to be the $+1^{st}$ order diffracted ray, by coordinating with the example of the objective lens stated later, however, it can be determined to be another orders diffracted ray except the zero order diffracted ray. Further, the optical detector 300 is not limited to such a type to receive a reflected light flux from the first and second optical information recording medium, and the optical detector 300 includes such a type to receive a light flux transmitting through the first and second optical information recording medium. The objective lens preferable to the present embodiment mentioned above is explained as follows. FIG. 2 is the diagram showing schematically the upper part of the optical axial section of the objective lens having the diffractive structure. The objective lens shown in FIG. 2 can record and reproduce information for both of DVD and CD.

The first surface S1 of the objective lens 20 shown in FIG. 2 has the reflective aspheric surface in the central region which corresponds to the numerical aperture NA1, and the diffractive structure D composed of a plurality of the saw-tooth shaped (serrated) ring zones of r1, r2, ... in the peripheral region which corresponds to the numerical aperture more than NA 1 and less than NA 2. Incidentally, the saw-tooth means that its section including the optical axis is in a saw-tooth shape (the serrated shape), and the optical transmission efficiency can be kept well by this form. Further, in this embodiment, by making the step section to be cylindrical surface being parallel with the optical axis, the moldability becomes higher and the optical transmission efficiency becomes better. The number of the ring-shaped diffractive zones is preferably 5 or more and 20 or less.

The diffractive surface is expressed by the basic aspheric surface showing the macroscopic form with its refractive relief removed and the optical path difference function. The optical path difference function shows the optical path difference that is added to the diffracted ray of the standard wavelength by the diffractive surface, and for each change of mλ (m represents diffraction order) of the value of the optical path difference function, the diffractive ring zone is provided.

The optical path difference function $\Phi(h)$ is expressed by the following formula.

$$\Phi(h)=b0+b2 \times h^2+b4 \times h^4+b6 \times h^{6+} \ldots \text{(mm)}$$

where, h: distance from the optical axis b0, b2, b4, b6, . . . : coefficients of the optical path difference function Further, the aspheric surface is expressed by the following formula.

$$X=(h^2/r)/(1+\sqrt{(1-(1+k)h^2/r^2)})+A0+A2h^2+A4h^4+A6h^6 \ldots$$

here, A0, A2, A4, A6, . . . : aspherical coefficient k: constant of the cone r: paraxial radius of curvature n: refractive index The lens data of the present example is shown in Table 1. Here, d is a surface separation.

TABLE 1

| Wavelength λ (nm) | 655 | 785 |
|---|---|---|
| Focal length f (mm) | 3.05 | 3.07 |
| Magnification | 0 | −1/16.4 |

Number of the ring-shaped diffractive zones in the effective aperture of 3.66 of S1 corresponding to NA 0.6 in λ1 arrangement is 16.

| Surface No. | R | d1 | d2 | n1 | n2 |
|---|---|---|---|---|---|
| Object point | ∞ | 53.364 | | | |
| 1 (Aspheric surface) | (as follows) | 1.72 | 1.72 | 1.5292 | 1.5254 |
| 2 (Aspheric surface) | −7.4933 | 1.71 | 1.53 | | |
| 3 (Cover glass) | ∞ | 0.60 | 1.20 | 1.5775 | 1.5706 |
| 4 | ∞ | | | | |

Suffix 1 means when λ1 = 655 nm, suffix 2 means when λ2 = 785 nm.
Coefficients of the optical path difference function When
1.499 (the difference from the optical axis corresponding to NA 0.45 for λ2 arrangement) ≦ h
(blazed wavelength 655 nm)
b2 = 3.6039 × $10^{-3}$
b4 = −2.2324 × $10^{-3}$
b6 = 6.3457 × $10^{-4}$
b8 = −2.2513 × $10^{-4}$
b10 = 1.9017 × $10^{-5}$ Aspherical coefficients S1 surface When
h ≦ 1.499 (the difference from the optical axis corresponding to NA 0.45 for λ2 arrangement)
R = 1.8936
K = −1.6813
A0 = 0
A4 = 2.2355 × $10^{-2}$ -continued

| Surface No. | R | d1 | d2 | n1 | n2 |
|---|---|---|---|---|---|

$A6 = -6.6092 \times 10^{-4}$
$A8 = -8.2995 \times 10^{-5}$
$A10 = 1.4580 \times 10^{-4}$
$A12 = -3.3081 \times 10^{-5}$
$A14 = -2.0662 \times 10^{-7}$ When
1.499 (the difference from the optical axis corresponding to NA 0.45 for λ2 arrangement) ≦ h
$R = 2.0428$
$K = -3.0932 \times 10^{-1}$
$A0 = 1.3725 \times 10^{-2}$
$A4 = 1.5836 \times 10^{-2}$
$A6 = -7.4303 \times 10^{-3}$
$A8 = 1.3378 \times 10^{-3}$
$A10 = -2.0358 \times 10^{-4}$
$A12 = 2.1216 \times 10^{-6}$
$A14 = -5.2143 \times 10^{-6}$ S2 surface $K = 4.4788$
$A0 = 0$
$A4 = 2.2630 \times 10^{-2}$
$A6 = -1.0134 \times 10^{-2}$
$A8 = 5.7698 \times 10^{-3}$
$A10 = -2.4327 \times 10^{-3}$
$A12 = 5.3029 \times 10^{-4}$
$A14 = -4.6673 \times 10^{-5}$ In this example, this diffractive structure D is blazed by the wavelength λ1 of the semiconductor laser 111 representing the first light source, and the light flux from the first light source and the light flux from the second light source, or semiconductor laser 112, are designed so that their +1$^{st}$ order diffracted ray becomes to have the most amount of the light (95% and more of the light amounts of diffracted ray for all the orders for the first light source, and 90% and more of those for the second light source). Further, it is also designed so that the difference between the transmission efficiency of the diffracted ray of the diffraction order (here, +1$^{st}$ order) that generates the largest diffracted ray amount by this diffractive structure, and the transmission efficiency of the light flux having passed through the central region, among the light flux emitted from the first light source, may be within 5%.

For the first light source having the wavelength λ1 of 655 nm, the focal length f is 3.05, and the image side numerical aperture is 0.6 (necessary numerical aperture NA1 is 0.6). However, there is no need to be limited to the above mentioned value, and it is preferable if the wavelength λ1 satisfies the relationship of 640 nm<λ1<680 nm.

For the second light source having the wavelength λ2 of 785 nm, the focal length f is 3.07, and the image side numerical aperture is 0.45 (necessary numerical aperture NA2 is 0.45). However, there is no need for the numerical aperture NA2 to be equal to 0.45, and it is preferable if the NA2 satisfies the relationship of 0.45<NA2<0.6, and more preferable if it satisfies the relationship of 0.45<NA2<0.5. Further for the wavelength λ2, there is no need to be equal to 785 nm, and it is preferable if the wavelength λ2 satisfies the relationship of 750 nm<λ2<810 nm.

In this example, the thickness t1 of the transparent base board of the DVD representing the first optical information recording medium is 0.6 mm, while the thickness t2 of the transparent base board of the CD representing the second optical information recording medium is 1.2 mm, accordingly the relationship of t1<t2 is satisfied, but the invention is also applicable even in the case of the relationship of t1=t2.

Figure 3:
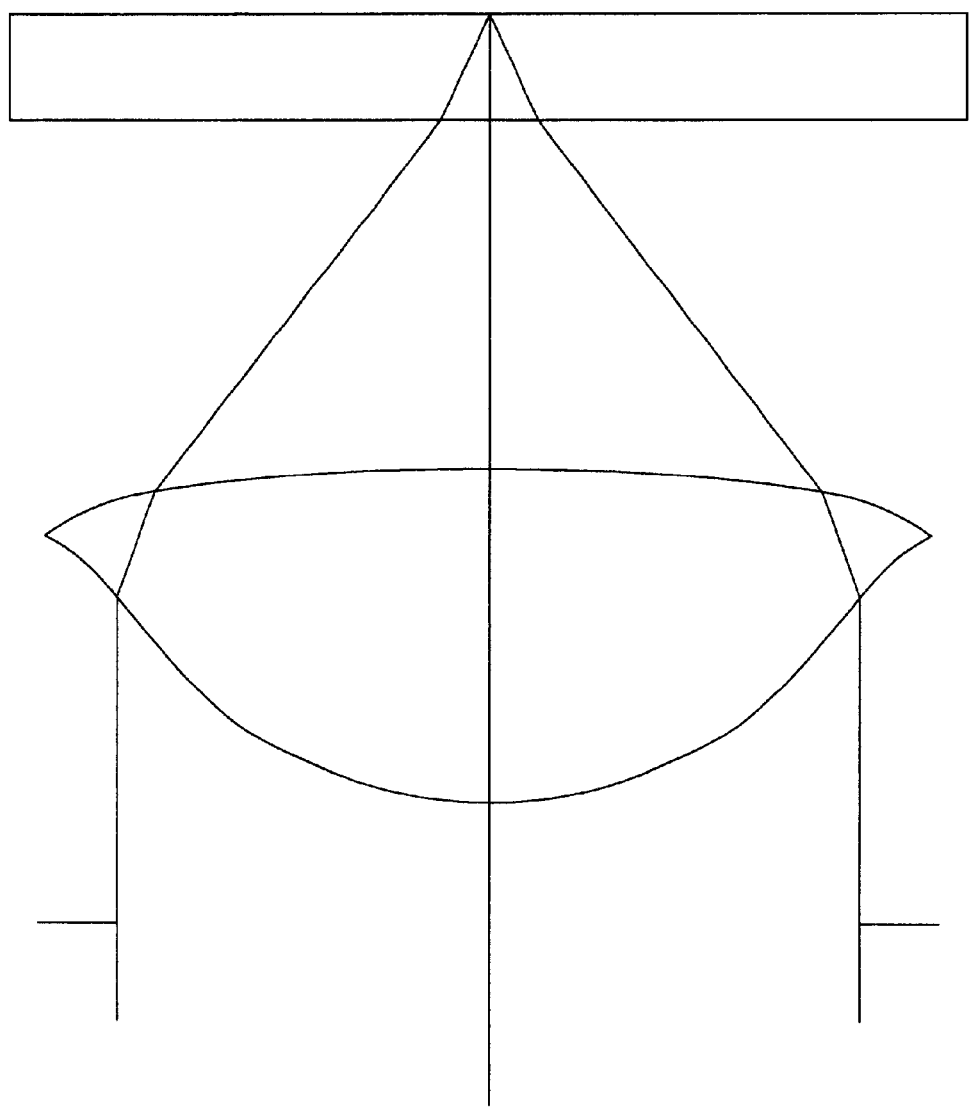
FIG. 3 is a section of the objective lens of the present example.
Figure 4:
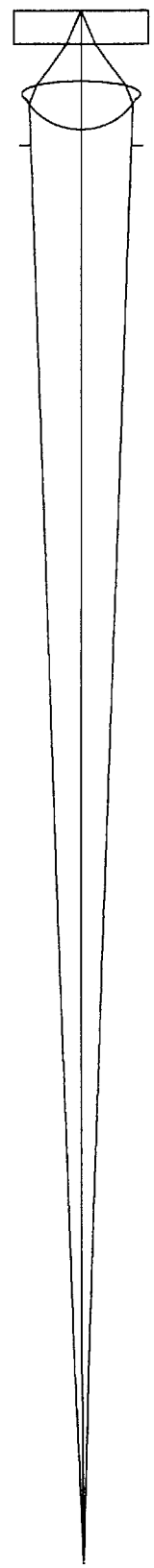
FIG. 4 is a section of the objective lens of the present example.
Figure 5:
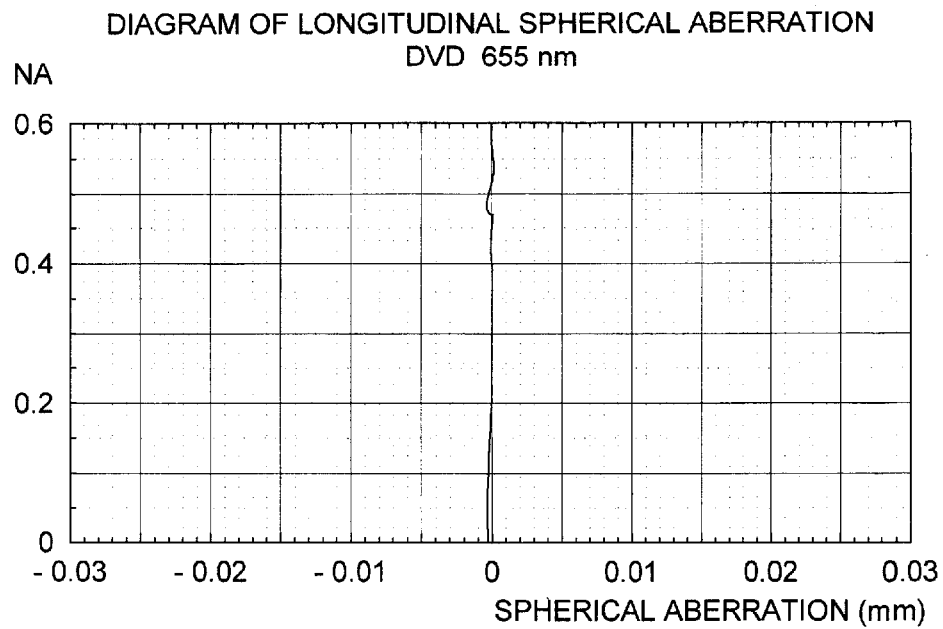
FIG. 5 is a diagram of the longitudinal spherical aberration of the objective lens of the present example in the case that DVD 655 nm.
Figure 6:
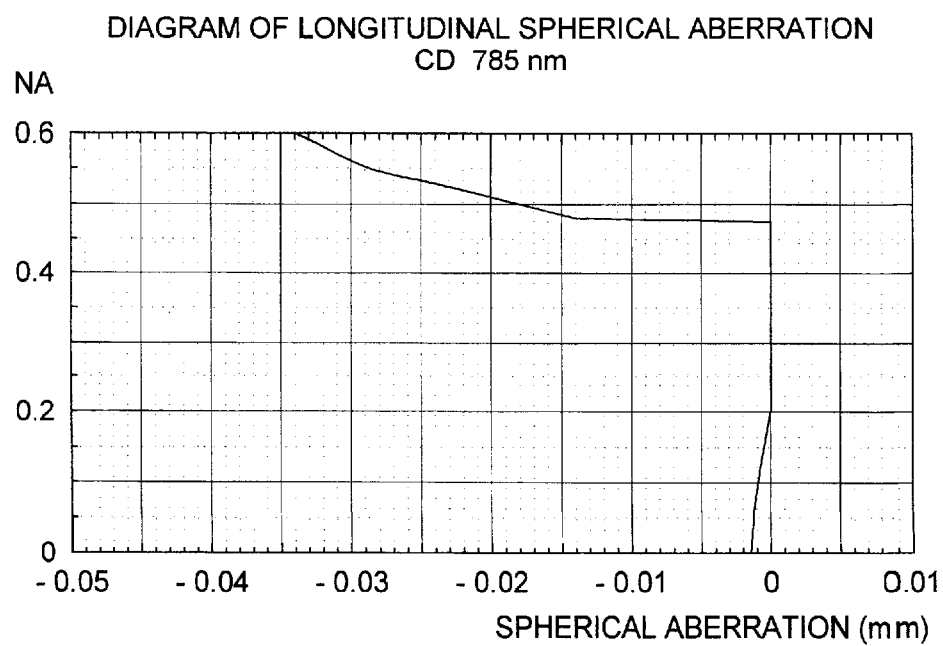
FIG. 6 is a diagram of the longitudinal spherical aberration of the objective lens of the present example in the case that CD 785 nm.

The section of the objective lens is shown in FIG. 3 (when DVD is used) and in FIG. 4 (when CD is used), and the drawings of the spherical aberration for the case of DVD is shown in FIG. 5, and that for CD is shown in FIG. 6. As it is clear from FIG. 5 and FIG. 6, regarding the light flux having the wavelength λ1 (655 nm) that performs the recording and reproduction of information for DVD, the diffracted ray that generates the maximum diffracted ray amount by the diffractive structure D (FIG. 1) is converged near the focus point of the light passing through the central region of the objective lens, on the other hand, regarding the light flux having the wavelength λ2 (785 nm) that performs the recording and reproduction of information for CD, the diffracted ray that generates the maximum amount of the diffracted ray by the diffractive structure D is given the spherical aberration that generates flare, by doing the foregoing, the numerical aperture becomes smaller substantially, accordingly it is possible to record and reproduce information for the optical information recording media each being different from others. Further, the diffractive structure D has the saw-tooth shaped (serrated) ring-shaped zones r1, r2, . . . in section, and can converge the light flux having wavelength of λ1 effectively.

The invention makes it possible to provide an objective lens for an optical pickup device and an optical pickup device which can conduct recording and/or reproducing of information for optical information recording media each being different from others, while keeping the cost lower.

What is claimed is:

1. An objective lens for use in an optical pickup device provided with a first light source which emits a light flux having wavelength λ1, a second light source which emits a light flux having wavelength λ2 different from λ1, a light converging optical system including at least the objective lens which converges the light flux emitted from the first light source on an information recording surface through a transparent base board of the first optical information recording medium when recording or reproducing information for the first optical information recording medium and converges the light flux emitted from the second light source on an information recording surface through a transparent base board of a second optical information recording medium when recording or reproducing information for the second optical information recording medium having a memory capacity different from that of the first optical information recording medium, and a photo detector which receives a reflected light or a transmitted light from the first and second optical information recording media, the objective lens comprising:

a central region and a peripheral region on at least one optical surface thereof, wherein the central region is not provided with a diffractive structure and the peripheral region adjoins the central region and is provided with a diffractive structure, wherein, NA1 represents a numerical aperture of the objective lens on an image side necessary for recording or reproducing information for the first optical information recording medium with the use of the first light source, a first spot represents a spot formed by the light flux having passed through the central region, and an m$^{th}$ order diffracted ray represents a diffracted ray having the maximum diffraction efficiency among diffracted rays generated on the diffractive structure by the light flux having passed through the peripheral region, wherein, NA2, being less than NA1, represents a numerical aperture of the objective lens on an image side necessary for recording or reproducing information for the second optical information recording medium with the use of the second light source, a second spot represents a spot formed by the light flux having passed through the central region, and an $n^{th}$ diffracted ray represents a diffracted ray having the maximum diffracton efficiency among diffracted rays generated on the diffractive structure by the light flux having passed through the peripheral region, wherein the central region nearly corresponds to a region through which the light flux in the inside of the numerical aperture NA2 passes, the light amount of the $n^{th}$ order diffracted ray which reaches the inside of the second spot is less than that of the $m^{th}$ order diffracted ray which reaches the inside of the first spot, and the $m^{th}$ order diffracted ray and the $n^{th}$ order diffracted ray satisfy the relationship of m=n, and each of m and n is an integer, other than zero.

2. The objective lens of claim 1, wherein a sectional form of the diffractive structure at a plane including an optical axis is serrated.

3. The objective lens of claim 2, wherein a stepped section of the serrated diffractive structure is nearly parallel to the optical axis.

4. The objective lens of claim 2, wherein the diffractive structure is blazed so as to have a blaze wavelength of λ1.

5. The objective lens of claim 1, wherein the light amount of the $n^{th}$ order diffracted ray is not less than 90% of the total light amount of the diffracted rays generated on the diffractive structure, when the light flux comes from the second light source to enter the objective lens.

6. The objective lens of claim 1, wherein the central region is an aspherical refracting surface.

7. The objective lens of claim 1, wherein the at least one optical surface consists of the central region and the peripheral region.

8. The objective lens of claim 1, wherein the light flux emitted from the second light source enters the objective lens with a divergent angle which is larger than that of the light flux emitted from the first light source.

9. The objective lens of claim 8, wherein the light flux which is emitted from the first light source and enters the objective lens is nearly in parallel to the optical axis.

10. The objective lens of claim 8, wherein the light flux emitted from the second light source enters the objective lens so that a lateral magnification m2 satisfies the following conditional formula:

−1/20<m2<−1/10.

11. The objective lens of claim 1, wherein the $n^{th}$ order diffracted ray crosses the optical axis at a position closer to the objective lens than that for the light flux having passed through the central region to form the second spot.

12. The objective lens of claim 1, wherein the diffractive structure on the peripheral region where the light flux in the inside of the numerical aperture NA1 passes comprises 5 to 20 ring-shaped diffractive zones.

13. The objective lens of claim 1, wherein the light flux of the $n^{th}$ order diffracted ray crosses the optical axis at a position 5 μm or more away from the position where the light flux having passed through the central region of the objective lens crosses the optical axis.

14. The objective lens of claim 1, wherein among the light flux emitted from the second light source and refracted on the basic aspheric surface of the diffractive structure on the peripheral region, a light flux having passed through a boundary area between the central region and the peripheral region crosses the optical axis at a position 5 μm or more away from a position where the light flux emitted from the second light source and having passed through the central region of the objective lens crosses the optical axis.

15. The objective lens of claim 1, wherein the numerical aperture NA2 satisfies the following conditional formula:

0.45<NA2<0.6.

16. The objective lens of claim 15, wherein the numerical aperture NA2 satisfies the following conditional formula:

0.45<NA2<0.5.

17. The objective lens of claim 1, wherein the wavelength λ1 satisfies the following conditional formula:

640 nm<λ1<680 nm, and the wavelength λ2 satisfies the following conditional formula:

750 nm<λ2<810 nm.

18. The objective lens of claim 1, wherein the thickness t1 of the transparent base board of the first optical information recording medium is less than the thickness t2 of the transparent base board of the second optical information recording medium.

19. The objective lens of claim 18, wherein the thickness t1 of the transparent base board of the first optical information recording medium is 0.6 mm and the thickness t2 of the transparent base board of the second optical information recording medium is 1.2 mm.

20. The objective lens of claim 1, wherein among the light flux emitted from the first light source, the difference between the transmittance of the $m^{th}$ order diffracted ray and the transmittance of the light flux passed through the central region is within 5%.

21. The objective lens of claim 1, wherein a stepped section is provided at a boundary of the central region and the pheripheral region.

22. The objective lens of claim 21, wherein the stepped section is protruded upward from the surface of the central region.

23. The objective lens of claim 22, wherein the stepped section is nearly parallel to the optical axis.

24. The objective lens of claim 21, wherein the central region is a contiguous refractive surface.

25. An optical pickup device, comprising:

a first light source which emits a light flux having wavelength λ1;

a second light source which emits a light flux having wavelength λ2 different from λ1;

a light-converging optical system including at least an objective lens which converges the light flux emitted from the first light source on an information recording surface through a transparent base board of the first optical information recording medium when recording or reproducing information for the first optical information recording medium and converges the light flux emitted from the second light source on an information recording surface through a transparent base board of a second optical information recording medium when recording or reproducing information for the second optical information recording medium having a memory capacity different from that of the first optical information recording medium; and a photo detector which receives a reflected light or a transmitted light from the first and second optical information recording media;

wherein the objective lens comprises a central region and a peripheral region on at least one optical surface thereof, wherein the central region is not provided with a diffractive structure and the peripheral region adjoins the central region and is provided with a diffractive structure, wherein, NA1 represents a numerical aperture of the objective lens on an image side necessary for recording or reproducing information for the first optical information recording medium with the use of the first light source, a first spot represents a spot formed by the light flux having passed through the central region, and an $m^{th}$ order diffracted ray represents a diffracted ray having the maximum diffraction efficiency among diffracted rays generated on the diffractive structure by the light flux having passed through the peripheral region, wherein, NA2, being less than NA1, represents a numerical aperture of the objective lens on an image side necessary for recording or reproducing information for the second optical information recording medium with the use of the second light source, a second spot represents a spot formed by the light flux having passed through the central region, and an $n^{th}$ diffracted ray represents a diffracted ray having the maximum diffraction efficiency among diffracted rays generated on the diffractive structure by the light flux having passed through the peripheral region, and wherein the central region nearly corresponds to a region through which the light flux in the inside of the numerical aperture NA2 passes, the light amount of the $n^{th}$ order diffracted ray which reaches the inside of the second spot is less than that of the $m^{th}$ order diffracted ray which reaches the inside of the first spot, and the $m^{th}$ order diffracted ray and the $n^{th}$ order diffracted ray satisfy the relationship of m=n, and each of m and n is an integer, other than zero.

26. The optical pickup apparatus of claim 25, wherein a sectional form of the diffractive structure at a plane including an optical axis is serrated.

27. The optical pickup apparatus of claim 26, wherein a stepped section of the serrated diffractive structure is nearly parallel to the optical axis.

28. The optical pickup apparatus of claim 26, wherein the diffractive structure is blazed so as to have a blaze wavelength of $\lambda 1$.

29. The optical pickup apparatus of claim 25, wherein the light amount of the $n^{th}$ order diffracted ray is not less than 90% of the total light amount of the diffracted rays generated by the diffractive structure, when the light flux comes from the second light source to enter the objective lens.

30. The optical pickup apparatus of claim 25, wherein the central region is an aspherical refracting surface.

31. The optical pickup apparatus of claim 25, wherein the at least one optical surface consists of the central region and the peripheral region.

32. The optical pickup apparatus of claim 25, wherein the light flux emitted from the second light source enters the objective lens with a divergent angle which is larger than that of the light flux emitted from the first light source.

33. The optical pickup apparatus of claim 32, wherein the light flux which is emitted from the first light source and enters the objective lens is nearly in parallel to the optical axis.

34. The optical pickup apparatus of claim 32, wherein the light flux emitted from the second light source enters the objective lens so that a lateral magnification m2 satisfies the following conditional formula:

$$-1/20 < m2 < -1/10.$$

35. The optical pickup apparatus of claim 25, wherein the light flux of the $n^{th}$ order diffracted ray crosses the optical axis at a position closer to the objective lens than that for the light flux having passed through the central region to form the second spot.

36. The optical pickup apparatus of claim 25, wherein the diffractive structure on the peripheral region where the light flux in the inside of the numerical aperture NA1 passes comprises 5 to 20 ring-shaped diffractive zones.

37. The optical pickup apparatus of claim 25, wherein the light flux of the $n^{th}$ order diffracted ray crosses the optical axis at a position 5 $\mu$m or more away from the position where the light flux having passed through the central region of the objective lens crosses the optical axis.

38. The optical pickup apparatus of claim 25, wherein among the light flux emitted from the second light source and refracted on the basic aspheric surface of the diffractive structure on the peripheral region, a light flux having passed through a boundary area between the central region and the peripheral region crosses the optical axis at a position 5 $\mu$m or more away from a position where the light flux emitted from the second light source and having passed through the central region of the objective lens crosses the optical axis.

39. The optical pickup apparatus of claim 25, wherein the numerical aperture NA2 satisfies the following conditional formula:

$$0.45 < NA2 < 0.6.$$

40. The optical pickup apparatus of claim 39, wherein the numerical aperture NA2 satisfies the following conditional formula:

$$0.45 < NA2 < 0.5.$$

41. The optical pickup apparatus of claim 25, wherein the wavelength $\lambda 1$ satisfies the following conditional formula:

$$640 \text{ nm} < \lambda 1 < 680 \text{ nm, and}$$

the wavelength $\lambda 2$ satisfies the following conditional formula:

$$750 \text{ nm} < \lambda 2 < 810 \text{ nm}.$$

42. The optical pickup apparatus of claim 25, wherein the thickness t1 of the transparent base board of the first optical information recording medium is less than the thickness t2 of the transparent base board of the second optical information recording medium.

43. The optical pickup apparatus of claim 42, wherein the thickness t1 of the transparent base board of the first optical information recording medium is 0.6 mm and the thickness t2 of the transparent base board of the second optical information recording medium is 1.2 mm.

44. The optical pickup apparatus of claim 25, wherein among the light flux emitted from the first light source, the difference between the transmission efficiency of the $m^{th}$ order diffracted ray and the transmission efficiency of the light flux passed through the central region is within 5%.

45. An objective lens characterized in that the objective lens is used in the optical pickup apparatus described in claim 25.

46. An objective lens for use in an optical pickup device, comprising:

a central region and a peripheral region on at least one optical surface thereof, wherein the central region is not provided with a diffractive structure and the peripheral region adjoins the central region and is provided with a diffractive structure, wherein when a parallel light flux of a first laser beam having a wavelength λ1 enters into the objective lens, a first spot is a spot formed by a light flux having passed through the central region at a position where a spherical aberration component of a wave front aberration of the light flux having passed through the central region becomes minimum, and an $m^{th}$ order diffracted ray represents a diffracted ray having the maximum diffracted ray amount among diffracted rays generated by the diffractive structure from the light flux having passed through the peripheral region, wherein when a parallel light flux of a second laser beam having a wavelength λ2 different from λ1 enters into the objective lens, a second spot is a spot formed by a light flux having passed through the central region at a position where a spherical aberration component of a wave front aberration of the light flux having passed through the central region becomes minimum, and an $n^{th}$ order diffracted ray represents a diffracted ray having the maximum diffracted ray amount among diffracted rays generated by the diffractive structure from the light flux having passed through the peripheral region, and wherein the light amount of the $n^{th}$ order diffracted ray which reaches the inside of the second spot is less than that of the $m^{th}$ order diffracted ray which reaches the inside of the first spot, and the $m^{th}$ order diffracted ray and the $n^{th}$ order diffracted ray satisfy the relationship of m=n, and each of m and n is an integer, other than zero.

47. The objective lens of claim 46, wherein a sectional form of the diffractive structure at a plane including an optical axis is serrated.

48. The objective lens of claim 47, wherein a stepped section of the serrated diffractive structure is nearly parallel to the optical axis.

49. The objective lens of claim 46, wherein the diffractive structure is blazed so as to have a blaze wavelength of λ1.

50. The objective lens of claim 49, wherein when the parallel light flux of the second laser beam enters into the objective lens, the light amount of the $n^{th}$ order diffracted ray is not less than 90% of the total light amount of the diffracted rays generated on the diffractive structure.

51. The objective lens of claim 46, wherein the central region is an aspherical refracting surface.

52. The objective lens of claim 46, wherein the at least one optical surface consists of the central region and the peripheral region.

53. The objective lens of claim 46, wherein when the light flux of the second laser beam enters such that the light flux is diverged by a predetermined angle than a parallel light flux, the absolute value of a spherical aberration component of a wave front aberration of a light flux having passed through the central region is smaller than that of a light flux forming the second spot.

54. The objective lens of claim 53, wherein the second laser beam enters the objective lens so that a lateral magnification m2 satisfies the following conditional formula:

$$-1/20 < m2 < -1/10.$$

55. The objective lens of claim 46, wherein when the light flux of the first laser beam enters such that the light flux is nearly a parallel light flux, the absolute value of a spherical aberration component of a wave front aberration of a light flux having passed through the central region becomes minimum in comparison with that of a light flux diverged from the parallel light flux or a light flux converged from the parallel light flux.

56. The objective lens of claim 46, wherein the $n^{th}$ order diffracted ray crosses the optical axis at a position closer to the objective lens than that for the light flux having passed through the central region to form the second spot.

57. The objective lens of claim 46, wherein the diffractive structure on the peripheral region where the light flux in the inside of the numerical aperture NA1 passes comprises 5 to 20 ring-shaped diffractive zones.

58. The objective lens of claim 46, wherein the light flux of the $n^{th}$ order diffracted ray crosses the optical axis at a position 5 μm or more away from the position where the light flux having passed through the central region of the objective lens to form the second spot crosses the optical axis.

59. The objective lens of claim 46, wherein when a parallel light flux of the second laser beam enters into the objective lens, the light flux refracted by the basic aspheric surface of the diffractive structure on the peripheral region crosses the optical axis at a position 5 μm or more away from a position where the light flux having passed through the central region of the objective lens crosses the optical axis.

60. The objective lens of claim 46, wherein the wavelength λ1 satisfies the following conditional formula:

$$640\ nm < \lambda 1 < 680\ nm,\ and$$

the wavelength λ2 satisfies the following conditional formula:

$$750\ nm < \lambda 2 < 810\ nm.$$

61. An optical pickup device, comprising:
- a first light source which emits a first laser beam having wavelength λ1;
- a second light source which emits a second laser beam having wavelength λ2 different form λ1;
- a light-converging optical system including at least an objective lens which converges the first laser beam emitted from the first light source on an information recording surface through a transparent base board of the first optical information recording medium when recording or reproducing information for the first optical information recording medium and converges the second laser beam emitted from the second light source on an information recording surface through a transparent base board of a second optical information recording medium when recording or reproducing information for the second optical information recording medium having a memory capacity different from that of the first optical information recording medium; and
- a photo detector which receives a reflected light or a transmitted light from the first and second optical information recording media,
- wherein the objective lens, comprises:
  - a central region and a peripheral region on at least one optical surface thereof, wherein the central region is not provided with a diffractive structure and the peripheral region adjoins the central region and is provided with a diffractive structure,
  - wherein when a parallel light flux of the first laser beam enters into the objective lens, a first spot is a spot formed by a light flux having passed through the central region at a position where a spherical aberration component of a wave front aberration of the light flux having passed through the central region becomes minimum, and an $m^{th}$ order diffracted ray represents a diffracted ray having the maximum diffracted ray amount among diffracted rays generated by the diffractive structure from the light flux having passed through the peripheral region, wherein when a parallel light flux of the second laser beam enters into the objective lens, a second spot is a spot formed by a light flux having passed through the central region at a position where a spherical aberration component of a wave front aberration of the light flux having passed through the central region becomes minimum, and an $n^{th}$ order diffracted ray represents a diffracted ray having the maximum diffracted ray amount among diffracted rays generated by the diffractive structure from the light flux having passed through the peripheral region, and wherein the light amount of the $n^{th}$ order diffracted ray which reaches the inside of the second spot is less than that of the $m^{th}$ order diffracted ray which reaches the inside of the first spot, and the $m^{th}$ order diffracted ray and the $n^{th}$ order diffracted ray satisfy the relationship of m=n, and each of m and n is an integer, other than zero.

62. The optical pickup apparatus of claim 61, wherein the wavelength λ1 satisfies the following conditional formula:

640 nm<λ1<680 nm, and the wavelength λ2 satisfies the following conditional formula:

750 nm<λ2<810 nm, and wherein the first optical information medium is a DVD and the second optical information medium is a CD.

* * * * *

UNITED STATES PATENT AND TRADEMARK OFFICE
CERTIFICATE OF CORRECTION

PATENT NO. : 6,728,172 B2
DATED : April 27, 2004
INVENTOR(S) : Kiyono Ikenaka et al.

It is certified that error appears in the above-identified patent and that said Letters Patent is hereby corrected as shown below:

Title page,
Item [57], ABSTRACT,
Line 2, "N2" should read -- NA2 --.

Column 20,
Line 37, "pheripheral" should read -- peripheral --.

Signed and Sealed this

Thirtieth Day of November, 2004

JON W. DUDAS
*Director of the United States Patent and Trademark Office*